United States Patent
Raj et al.

(10) Patent No.: US 6,215,534 B1
(45) Date of Patent: *Apr. 10, 2001

(54) ALIGNING ELECTRO-OPTIC MATERIAL HAVING STANDOFFS FORMED FROM A FOURTH OR HIGHER METAL INTERCONNECTION LAYER

(75) Inventors: Kannan Raj, Chandler, AZ (US); Oleg Rashkovskiy, Cupertino, CA (US); Anthony C. Miller, Gilbert, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/283,337

(22) Filed: Mar. 31, 1999

(51) Int. Cl.[7] .................. G02F 1/1333; G02F 1/1343; G02F 1/1339
(52) U.S. Cl. ................... 349/84; 349/139; 349/155
(58) Field of Search .................. 349/139, 147, 349/143, 84, 38, 39, 42, 155, 156, 141

(56) References Cited

U.S. PATENT DOCUMENTS

| | | | |
|---|---|---|---|
| 5,181,132 | * 1/1993 | Shindo et al. | 349/155 |
| 5,461,501 | * 10/1995 | Sato et al. | 349/42 |
| 5,691,793 | * 11/1997 | Watanabe et al. | 349/155 |
| 5,712,695 | * 1/1998 | Tanaka et al. | 349/139 |
| 5,764,324 | * 6/1998 | Lu et al. | 349/147 |
| 5,905,557 | * 5/1999 | Yaniv | 349/139 |
| 5,905,558 | * 5/1999 | Tokunaga et al. | 349/147 |
| 6,005,648 | * 12/1999 | Zhang et al. | 349/141 |

* cited by examiner

*Primary Examiner*—Walter J. Malinowski
(74) *Attorney, Agent, or Firm*—Trop, Pruner & Hu, P.C.

(57) ABSTRACT

An electro-optical device may include two pairs of electrodes which apply electric fields oriented at an angle with respect to one another. In this way, a second electric field may be used to create an alignment effect in the electro-optic material which normally is achieved using specially prepared alignment structures. The need for the alignment structures may be reduced or eliminated. The second electric field may be applied, for example, using metallic standoffs which space a top plate from a lower substrate and define a region for the electro-optic material. In this way, in large arrays, the electric field may be applied from a plurality of points improving the uniformity of the applied electric field. In smaller arrays, the field may be applied, for example, using peripheral electrodes.

16 Claims, 3 Drawing Sheets

ALIGNING ELECTRO-OPTIC MATERIAL HAVING STANDOFFS FORMED FROM A FOURTH OR HIGHER METAL INTERCONNECTION LAYER

BACKGROUND

This invention relates generally to electro-optical devices such as liquid crystal devices.

Liquid crystal displays use a spatial light modulator (SLM) made up of a top plate and a substrate which surround a liquid crystal material. Conventionally, the region for the liquid crystal material is defined by spacer balls which may be distributed over the substrate. In addition, it is known to fabricate insulating spacers directly on a silicon substrate. The function of the spacers is to maintain the distance between the top plate and the substrate and to define the region for the liquid crystal.

Liquid crystal devices using liquid crystal over a silicon substrate (LCOS) technology may form large screen projection displays or smaller displays (using direct viewing rather then projection technology). Typically, the liquid crystal material is suspended over a thin passivation layer. A glass plate with an indium tin oxide (ITO) layer covers the liquid crystal, creating the liquid crystal unit sometimes called a cell. The glass layer is typically suspended over the liquid crystal by a gasket that surrounds the cell array.

A silicon substrate may define a large number of pixels. Each pixel may include semiconductor transistor circuitry in one embodiment. The pixel may have a top reflective layer. An electrical potential may be applied to an electro-optical material using the reflective layer. A transparent top plate may have an inner transparent conductive layer that acts as an electrode that works with the reflective layer. An electrical field generated at each pixel may alter optical characteristics of an electro-optical material between the silicon substrate and the top plate. For example, the polarization of light passing through the electro optical material may be altered. As another example, the electro-optical material may change its light transmission characteristics.

In conventional electro-optic devices, the electro-optic material is aligned in a preferential direction by alignment layers on either side of the electro-optic material. The alignment layers may be made of polyimide or polyvinyl alcohol (PVA). The alignment layers may be formulated by rubbing an indium tin oxide coated glass with a nylon coated velvet cloth. This action may create microgrooves such that electro-optic molecules align along the microgrooves thereby becoming aligned preferentially.

For transmissive liquid crystal modulators the alignment layers are rubbed on the top and bottom indium tin oxide plates. In reflective modulators such as a liquid crystal over silicon modulators, the bottom electrode layer is a metal layer over silicon. Rubbing on this surface may be cumbersome and may require protection measures against electrostatic discharge. Therefore alignment layers are created by oblique deposition of thin layers of silicon oxide.

Controlling the electro-optic properties is a tricky and laborious task which may take several literations to get the manufacturing process right. Further, the alignment process is dependent on the type and nature of the electro-optic material used. Thus, there is continuing need for better ways to create the desired alignment in electro-optic materials such as liquid crystals.

SUMMARY

In one embodiment of the present invention, an electro-optical device includes first and second pairs of electrodes. The first and second pairs of electrodes are adapted to apply different electric fields to an electro-optic material.

DETAILED DESCRIPTION

Figure 1:
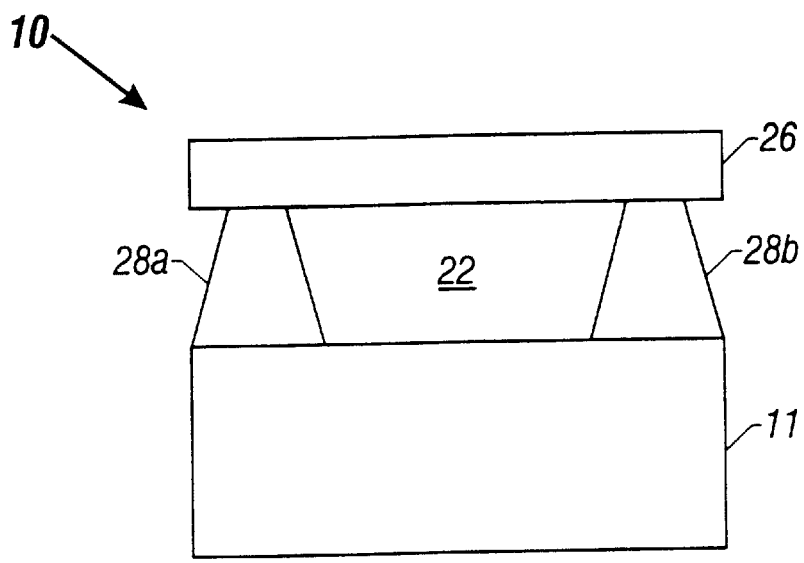
FIG. 1 is a side elevational view of one embodiment of the present invention.

Referring to FIG. 1, an electro-optical device 10, such as a spatial light modulator (SLM), includes a substantially light transmissive top plate 26 and a substrate 11. A plurality of metallic standoffs 28, including the standoffs 28a and 28b, provide spacing between the substrate 11 and the top plate 26. The metallic standoffs 28 may be formed using conventional semiconductor manufacturing processing. For example, in one embodiment of the invention, they may be formed (by etching, for example) from the metal four (or higher) metal layer used in conventional semiconductor processing. Thus, little or no additional processing overhead may result from forming spacers in this way. In addition, the spacers provide a very well defined cell thickness across even large arrays of cells.

The metallic standoffs 28 may be formed entirely or partially of a metallic material. Suitable metallic materials include metals, such as aluminum, copper, and tungsten metal alloys, and polysilicon including metal silicides. In some embodiments the standoffs 28 may be formed of an electrically conductive material such as metal or doped polysilicon.

Figure 2:
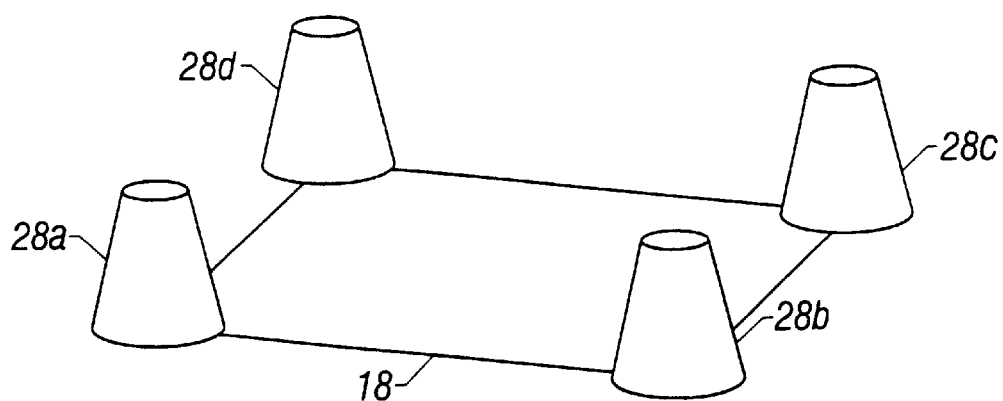
FIG. 2 is a perspective view of a portion of the embodiment shown in FIG. 1.

Referring to FIG. 2, each cell may include a reflective mirror 18. In the illustrated embodiment, the mirror 18 is rectangular or square and a standoff 28a–d is formed at each of the cell's corners. In one embodiment, each of the standoffs partly overlaps each cell to assist in spacing a total of four adjacent cells. Of course, in other embodiments a higher or lower number of standoffs may be used. In addition, while the standoffs 28 are illustrated as having a truncated frustoconical shape, other standoff shapes may be used as well, including cylindrical, pyramidal, and rectangular solid shapes.

Figure 3:
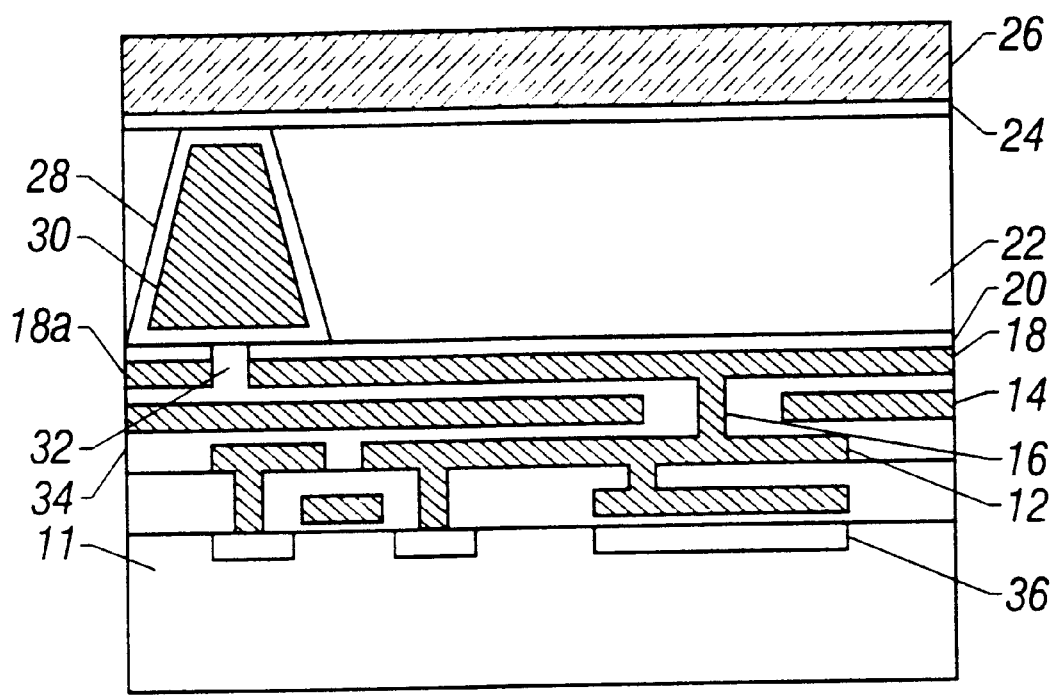
FIG. 3 is an enlarged cross-sectional view taken vertically through one of the standoffs shown in FIG. 1.

Referring now to FIG. 3, the detailed configuration of one embodiment of the present invention is illustrated. In this embodiment, an LCOS structure is defined using the silicon substrate 11 having doped regions 36 formed therein. In one illustrated embodiment, four or more metal layers are provided including a metal one layer 12 which is spaced by an interlayer dielectric (ILD) 34 from a metal two layer 14 and a metal three layer 18, which may form a pixel mirror. In one embodiment the metal two layer may provide light blocking and the metal one layer may provide the necessary interconnections for the semiconductor devices. This leaves the metal four (or higher) layer to form the standoffs 28. The pixel mirror 18 may electrically connect to the metal one layer 12 using a via 16, which in one embodiment of the invention may be formed of tungsten.

A gap 32 may exist between adjacent cells as illustrated in FIG. 3. Thus, the layer 18 may be part of one cell while the layer 18a is the beginning of an adjacent cell. A standoff 28 may straddle at least two adjacent cells, and in some cases, such as the one illustrated in FIG. 2, each standoff 28 may straddle four adjacent cells.

In one embodiment of the invention, the standoffs 28 may be covered by a dielectric material 30 formed during passivation. Typically, the material 30 is deposited using conventional techniques. Suitable materials for the layer 30 include oxides and nitrides.

The top plate 26 may be coated with an indium tin oxide (ITO) layer 24. In embodiments where the insulating layer 30 is omitted, a polyimide layer may be used between the indium tin oxide layer 24 and the upper end of the metallic standoff 28. The polyimide layer may provide electrical isolation. Other insulating materials may be coated on the ITO layer 24 in place of or in addition to the polyimide layer.

Figure 4:
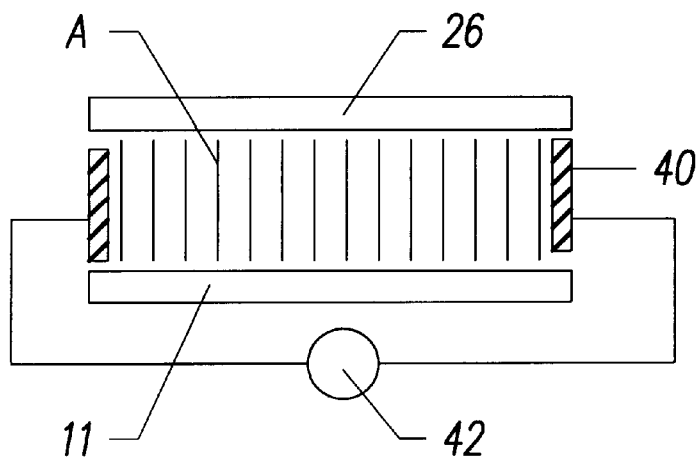
FIG. 4 is a schematic depiction of one embodiment of the present invention.

Referring to FIG. 4, a pair of electrodes 40 may be arranged to create an electric field transverse to the plane defined by the top plate 26 and the substrate 11. The transverse field may preferentially align the electro-optic molecules, as indicated at "A". The substrate 11 and the top plate 26 act as electrodes and apply an electric field in a first direction. The electrodes 40 apply an electric field in a second direction, in the illustrated embodiment, transversely to the electric field applied by the top plate 26 and the substrate 11. The potential for creating the transverse electric field may be produced by a voltage source 42. As a result, the electro-optic molecules may be aligned as indicated without the need for providing alignment layers.

In one embodiment of the invention, the transverse electric field is applied orthogonally to the cell. This field orients the electro-optic directors along the direction of the applied field. The field strength and the resulting director orientation depend on parameters such as free energy tilt and twist, elastic constants, chirality and the constituents of the electro-optic material, among other things. The orthogonal field may be created by electrodes along the periphery of the cell. If the cell area is small enough, the peripheral electrodes may be sufficient to provide the right tilt of the molecules.

If the electro-optic array is large, the effective field may not be strong enough to tilt the molecules along the desired direction. Effective local control of the tilt may not always be possible by applying the field only from the cell periphery. This shortcoming may be overcome by applying a potential from the conductive standoffs 28. That is, using the top layer 26 as an electrode, a field may be applied through the standoffs 26 orthogonally to the electro-optic cell.

Figure 5:
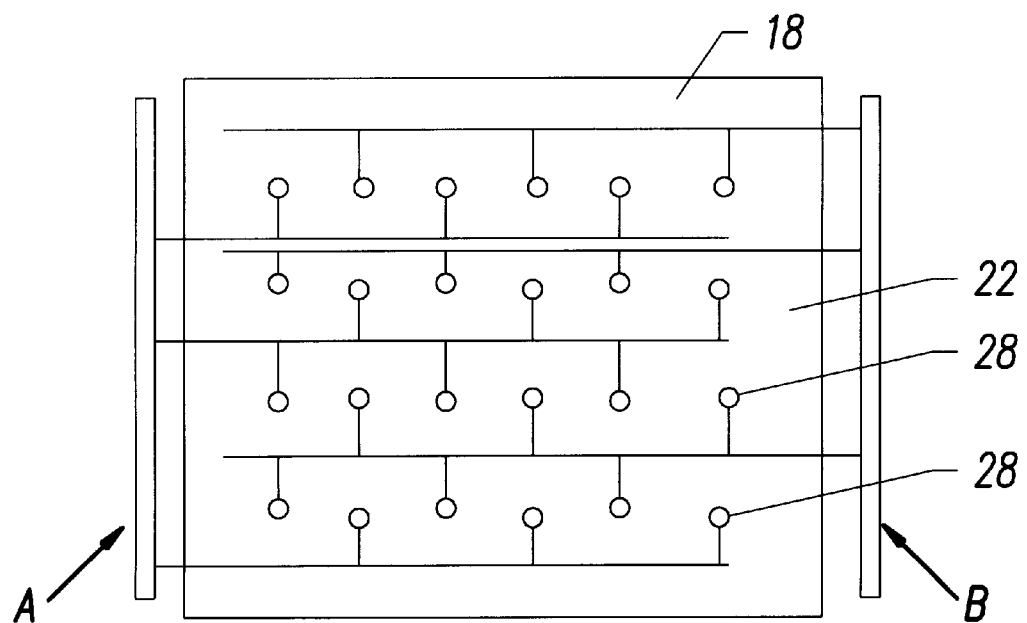
FIG. 5 is a top plan view of another embodiment of the invention.

If the standoffs are positioned at regular intervals over the cell 18, as indicated in FIG. 5, other combinations of electric field can be applied through these standoffs to achieve different types of alignment effects.

For example, the standoffs formed in the metal four layer may be divided into groups A and B similar to a checkerboard pattern. The group A standoffs may be tied together electrically from the bottom layers, for example using the metal two lines, and a voltage $e_a$ may be applied to these standoffs. Similarly, the standoffs in group B may be electrically coupled, for example using metal one lines, and a voltage $e_b$ may be applied to them. By using the lower interconnect layer or metal one layer, the possibility of metal shorting may be reduced. In this configuration, the electro-optic material is between the applied potentials $e_a$–$e_b$ throughout the cell.

The number of standoffs that are used and the distance between them may depend on the field strength and the interaction of the molecules with the field. The orthogonal electric field interaction may depend upon the particular material chosen and can be optimized, knowing the parameters such as twist, tilt, dopants, birefringence, dielectric, anisotropy, viscosity and the nature of the dopants in the electro-optic material mixture. The material alignment may then be controlled for different applications and hence yield may improve in some embodiments because alignment defects may be reduced.

With this approach, the need for the alignment layers may be totally or partially eliminated. In some embodiments, the alignment coating and rubbing steps may be eliminated as well which may result in better yield and reduced cost in some cases. In addition, in some embodiments, variable alignment may be obtained by changing the applied electric field whereas in conventional devices once the alignment layers are formed, adjustment of alignment is no longer possible.

In addition, in some embodiments, different areas of the array can have different alignments for particular applications by varying the applied electric field. In general the filling and packaging processes should be simplified because the alignment steps are removed. This may result in reduced cost in some cases.

In one embodiment of the present invention, the bias supplied to the $e_a$ and $e_b$ electrodes may be periodically reversed. This may have the benefit of DC balancing by reversing the direction of potentially damaging effects of ionic migration. This could result in improved lifetime.

After fabrication, in one embodiment, a liquid crystal material is added to the region 22 using conventional techniques. For example, a gasket material (not shown) may encircle the cell array between the top plate 26 and the substrate 11. A notch (not shown) formed in the gasket allows liquid crystal material to be wicked through the notch into the region 22. The notch may thereafter be sealed using conventional techniques to retain the liquid crystal material in the region 22.

Suitable electro-optical materials may include liquid crystals, such as a ferroelectric liquid crystal, a polymer dispersed liquid crystal, a twisted nematic liquid crystal, and a polymer stabilized cholesteric texture liquid crystal.

In many cases, the use of the additional electrodes in the form of the standoffs in one embodiment of the present invention, provides an additional degree of design freedom. Thus, in some cases, it may be desirable to include the alignment layers and to use the additional electrodes to provide other advantageous control signals for an electro-optic device. For example, the additional electrodes, in the form of standoffs in one embodiment of the present invention, may be used to control the gray scale response of an electro-optic device. Alternatively, they may be used to control color, for example in a multi-layered electro-optic device. In multi-layered electro-optic devices, a plurality of layers of different liquid crystals may be used. The network of control electrodes may be utilized to change the color proximate to a given set of electrodes.

While the present invention has been described with respect to limited member of embodiments, those skilled in the art will appreciate numerous modifications and variations therefrom. It is intended that the appended claims cover all such modifications and variations as fall within the true spirit and scope of the present invention.

What is claimed is:

1. An electro-optic device comprising:
   a support structure having formed therein at least three metallic interconnection layers;

a pair of opposed planar surfaces arranged above said support structure;

an electro-optic material between said surfaces; and a pair of opposed electrodes between said surfaces, arranged to apply an electric field, said electrodes formed from a fourth or higher metallic interconnection layer, wherein said electrodes are formed by standoffs.

2. The device of claim 1 wherein said surfaces define a cell and said electrodes are arranged peripherally with respect to said cell.

3. The device of claim 1 wherein a plurality of electrodes are defined between said surfaces.

4. The device of claim 1 wherein said standoffs are metallic.

5. The device of claim 1 wherein the device does not include an alignment layer, said electrodes adapted to provide alignment.

6. The device of claim 1 including alignment layers aid pair of opposed electrodes enabling an additional control signal to be provided to said electro-optic material.

7. An electro-optic device comprising:

a semiconductor substrate including at least four metallic interconnection layers;

a first pair of electrodes;

a second pair of electrodes formed in said substrate from one of said metallic interconnection layers;

an electro-optic material, said first and second pairs of electrodes apply different electrical fields to said electro-optic material;

a top plate and a metallic standoff between said substrate and said top plate; and at least two pixel mirrors for different cells of said electro-optic device straddled by said metal standoff.

8. The electro-optic device of claim 7 wherein one of said metal layers provides interconnections for said silicon substrate, another of said metal layers provides for light blocking and still another of said metal layers provides for pixel reflection.

9. The electro-optic device of claim 7 wherein said standoff is formed from one of said at least four metallic interconnection layers, the layer utilized to form said standoff being positioned above three underlying metallic interconnection layers of said at least four metallic interconnection layers.

10. The electro-optic device of claim 7 wherein said metallic standoff is covered by an insulator.

11. The electro-optic device of claim 10 wherein said pixel mirror is formed from a metal layer beneath the metal layer used to form said metallic standoff.

12. The electro-optic device of claim 10 including an insulator between said metallic standoff and said pixel mirror.

13. The electro-optic device of claim 7 wherein said pixel mirrors are generally rectangular with a metallic standoff overlapping each of the four corners of said rectangular pixel mirror.

14. The electro-optic device of claim 7 wherein said first pair of electrodes defines a cell and said second pair of electrodes is arranged peripherally with respect to said cell.

15. The electro-optic device of claim 7 wherein a plurality of electrodes are defined between said top plate and said substrate.

16. The electro-optic device of claim 15 wherein said plurality of electrodes are standoffs.

* * * * *